United States Patent [19]

Kenson et al.

[11] 3,904,740

[45] Sept. 9, 1975

[54] CATALYST AND PROCESS FOR AMMONIA OXIDATION

[75] Inventors: Robert E. Kenson, Piscataway; Henry J. Albert, Colts Neck; Dante J. Accinno, Edison, all of N.J.

[73] Assignee: Engelhard Minerals & Chemicals Corporation, Murray Hill, N.J.

[22] Filed: Mar. 27, 1974

[21] Appl. No.: 455,127

Related U.S. Application Data

[63] Continuation of Ser. No. 239,652, March 30, 1972, abandoned.

[52] U.S. Cl. ................. 423/403; 252/472; 252/474
[51] Int. Cl.............................................. C01b 21/26
[58] Field of Search ............ 423/403, 404; 252/472, 252/477, 474

[56] References Cited
UNITED STATES PATENTS

| | | | |
|---|---|---|---|
| 2,167,708 | 8/1939 | Carter et al. | 423/403 |
| 2,566,283 | 8/1951 | Dowson | 75/172 |
| 3,627,497 | 12/1971 | Klein et al. | 423/403 |
| 3,660,024 | 5/1972 | Gillespie | 423/403 |

FOREIGN PATENTS OR APPLICATIONS

| | | | |
|---|---|---|---|
| 1,959,137 | 11/1969 | Germany | 423/403 |

*Primary Examiner*—G. O. Peters

[57] ABSTRACT

A catalyst and process for the oxidation of ammonia to oxides of nitrogen wherein an admixture of ammonia and oxidizing gas are passed over a catalyst alloy consisting of platinum, palladium, rhodium and gold in particular percentages of composition such that the alloy has a high efficiency in the oxidation of ammonia to oxides of nitrogen comparable to the conversion efficiency of the standard much more expensive 90% platinum – 10% rhodium alloy.

5 Claims, 3 Drawing Figures

CATALYST AND PROCESS FOR AMMONIA OXIDATION

This is a continuation of application Ser. No. 239,652, filed Mar. 30, 1972, now abandoned.

BACKGROUND OF THE INVENTION

The usual procedure in the oxidation of ammonia to oxides of nitrogen comprises passing a mixture of oxidizing gas, e.g. air, and ammonia gas in pre-determined proportions through a catalyst consisting of several layers, e.g. ten to about twenty layers, of gauze made from a 90% platinum – 10% rhodium alloy at suitable temperature between 650°C and 1,000°C to obtain oxides of nitrogen.

A catalyst alloy for the oxidation of ammonia has now been discovered, according to this invention, which uses less of the expensive platinum and rhodium metal than previously required in the 90% platinum – 10% rhodium alloy to achieve a comparable conversion efficiency. This is achieved by substituting less expensive palladium and gold for a considerable portion of the platinum and rhodium metal in the conventional 90% platinum – 10% rhodium alloy, which results in a saving in the cost of the catalyst thus permitting a more economical plant operation.

SUMMARY OF THE INVENTION

Oxidation of ammonia to oxides of nitrogen (NO and $NO_2$) is effected by passing an admixture of oxidizing gas, e.g. air, and ammonia gas in pre-determined proportions over a catalyst, preferably in the form of gauze, composed of an alloy of 45.0 to 55.0% platinum, 30.0 to 40.0% palladium, 5.0 to 7.0% rhodium and 5.0 to 15.0% gold, which has a high efficiency in the oxidation of ammonia to oxides of nitrogen comparable to the conversion efficiency of the standard much more expensive 90% platinum – 10% rhodium alloy.

DESCRIPTION OF THE PREFERRED EMBODIMENTS

In accordance with the invention oxidation of ammonia to oxides of nitrogen (NO and $NO_2$) is effected by passing an admixture of oxidizing gas, such as air, and ammonia in pre-determined proportions, e.g. 1 part ammonia to 9 parts air, over a catalyst alloy preferably in the form of gauze formed into a gauze pad of from about 10 to 50 layers of the gauze, so as to achieve the thickness required for optimum conversion of ammonia to NO and $NO_2$, the gauze being composed of an alloy of 45.0 to 55.0% platinum, 30.0 to 40.0% palladium, 5.0 to 7.0% rhodium and 5.0 to 15.0% gold, preferably an alloy of 48.5% platinum, 35% palladium, 6.5% rhodium and 10% gold. The above-mentioned alloys have a high efficiency in the oxidation of ammonia to oxides of nitrogen comparable to the conversion efficiency of the standard much more expensive 90% platinum – 10% rhodium alloy. Another alloy of the platinum-palladium-rhodium-gold system, i.e. 38.5% platinum, 35% palladium, 6.5% rhodium and 20% gold, which contains about 10% less platinum and 10% more gold than the above preferred alloy gave poor results. Thus, an alloy catalyst according to the invention within the composition ranges specified is unique as a catalyst in the oxidation of ammonia.

The ammonia oxidation apparatus shown in FIG. 1 was used to test various catalysts including the catalyst alloys set forth in the following table:

TABLE

Comparative Results
Alloy Gauze Tests For Ammonia Oxidation

| Alloy | Hours Run | Average Efficiency (%) $NH_3 \rightarrow NO$ |
|---|---|---|
| 90% Pt–10% Rh | (a) 388 | 93.5 |
| (48.5% Pt–35% Pd –6.5% Rh–10% Au) | (a) 240 | 96 |
| (38.5% Pt–35% Pd –6.5% Rh–20% Au) | (b) 307 | 94 |
| | (a) 84 | 73.5 |

Figure 1:
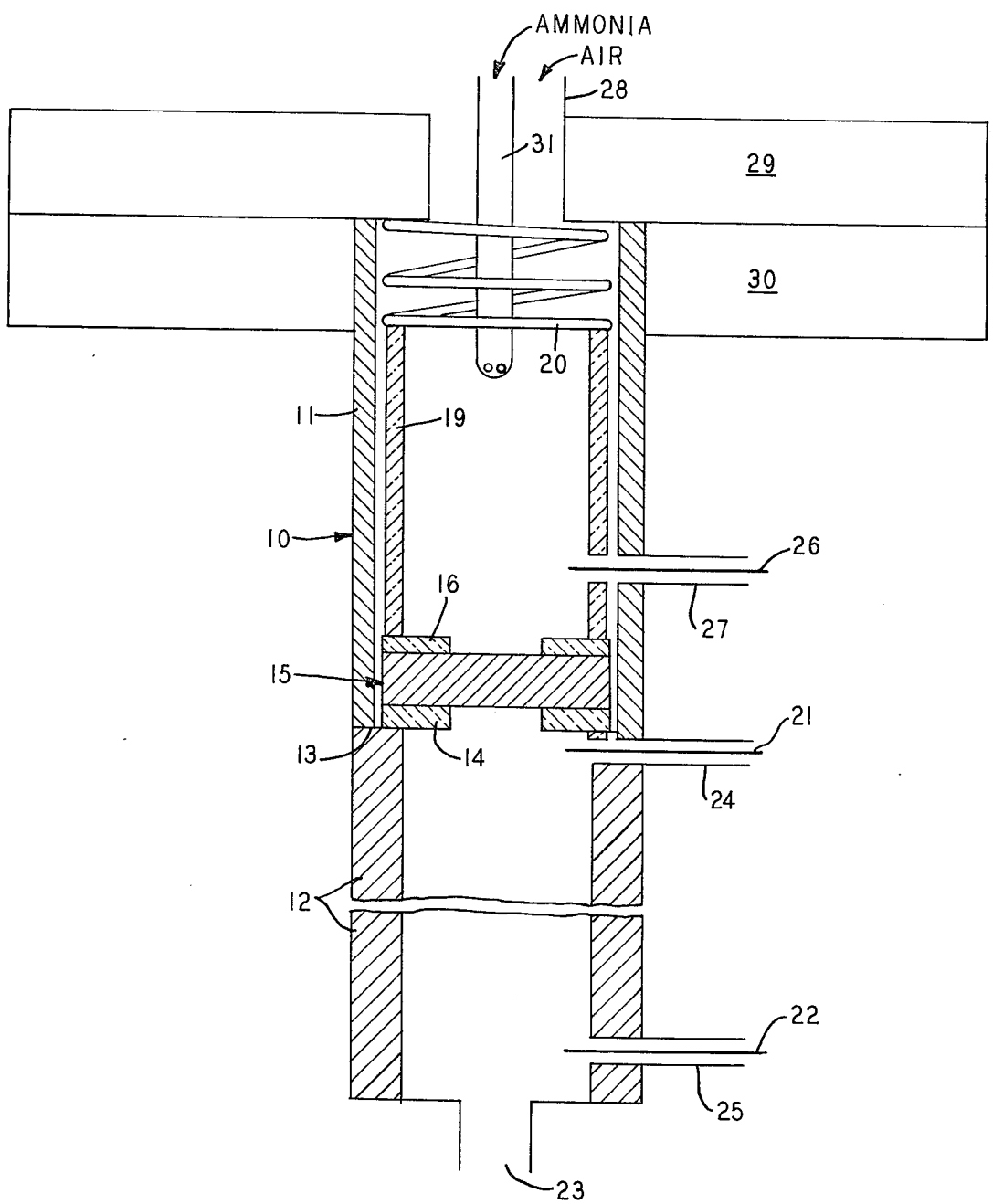
FIG. 1 is a schematic representation of an ammonia oxidation apparatus including a catalyst gauze pad made from the catalyst composition according to the invention.

(a) 20 layer gauze test - equal to full catalyst charge under commercial operations (b) 10 layer gauze test Referring to ammonia oxidation apparatus shown in FIG. 1, the apparatus comprises a reactor 10 having a reactor shell 11 which was 2 inches O.D. × 0.120 inch wall × 12½ inches length stainless steel tube to which a 2 inches O.D. × 0.375 inch wall × 24 inches length stainless steel tube 12 was welded. The zone 13 at which they were welded was used to retain a 0.840 inch I.D. × 1.50 inches O.D. quartz ring 14 on which the catalyst 15 was placed. A second quartz ring 16 of the same size as ring 14 was placed on top of the catalyst 15. The catalyst consists of a multilayer pad of catalyst metal gauze, e.g. having 10 to 20 layers. The catalyst 15 was held in place by a quartz liner 19 which was below compression spring 20. Spring pressure of spring 20 was used to hold the catalyst 15 in place and prevent channeling past the catalyst. The quartz liner 19 served to prevent the ammonia reaction with the hot metal reactor shell walls. Quartz wool (not shown) was packed between liner 19 and shell 11 to prevent gas bypass of the active catalyst surface which was 0.840 inch in diameter. Thermocouples 21 and 22 were used, respectively, to record the temperature ¼ inch below the catalyst 15 and at the reactor bottom outlet 23, respectively. The thermocouple taps 24 and 25 were also used to take gas samples from a gas flow stream when the unit was in operation. Thermocouple 26 and tap 27 placed above the catalyst 15 were used to measure the temperature and take sample taps upstream of the catalyst. The inlet conduit 28 for air was attached to the reactor 10 by 150 pound flanges 29 and 30, respectively.

In operation an experiment was started by pressurizing the apparatus with nitrogen and preheating the nitrogen to 280°C. When 280°C gas temperature was achieved, air was substituted for the nitrogen and the flow adjusted to the proper value. The air from a compressor, (not shown) was filtered and dried and fed through a rotameter (not shown) 360 standard cubic feet per hour (SCFH) into a preheater (not shown) which brought the air temperature to 280°C. Ammonia was vaporized from a heated cylinder (not shown) of compressed ammonia through a filter (not shown) to remove particulate matter. The ammonia was fed gradually through a rotameter (not shown) into the preheated air at 40 SCFH. This preheated 90% air–10% ammonia gas mixture was fed into the reactor 10. The mixing of the ammonia and air to give the 10–90% mixture was done with a sparging tube 31 from which ammonia was added into the preheated air. The total gas feed to the reactor was 400 SCFH and the linear velocity was 27 feet per second. The reactor pressure was 70 psig. Ammonia was very gradually introduced and reactive ignition was observed by a sudden increase in temperatures.

Flow of the ammonia was adjusted to proper value and analytical samples were taken at regular intervals.

Analysis of the gas feed was accomplished by purging a sampling bulb with a portion of the gas feed at ambient temperature and then closing the bulb. An excess of 0.1N $H_2SO_4$ solution was added to the bulb and the acid back titrated with 0.1N NaOH to determine the $NH_3$ volume percent by difference. Simultaneously an evacuated flask was filled to atmospheric pressure with a sample of product gas at 100°C. The resulting NO + $NO_2$ gas mixture was oxidized with excess $H_2O_2$ to yield a solution of nitric acid. The nitric acid was titrated with 0.1 NaOH to determine the total nitrogen oxides in volume percent. Conversion efficiencies were calculated after gas volume corrections were made as:

$$\text{Conversion Efficiency} (\%) = \frac{\text{Vol}\% \ NO_x}{\text{Vol}\% \ NH_3}$$

Pressure drops were measured with a differential mercury manometer.

Figure 2:
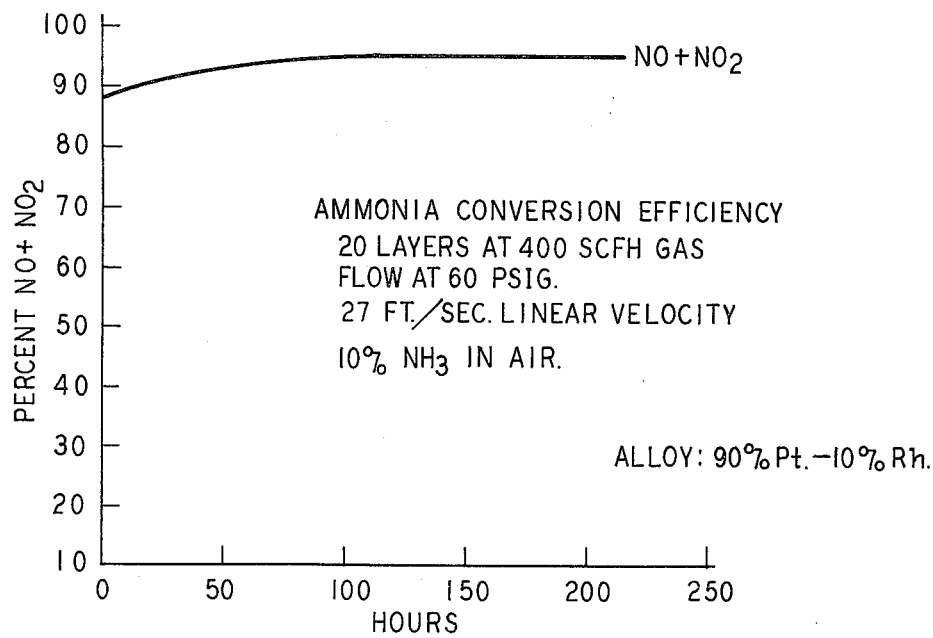
FIG. 2 illustrates a graphic representation of the ammonia conversion efficiency of the prior art catalyst alloy of 90% platinum – 10% rhodium.

FIG. 2 illustrates a graphic representation of the ammonia conversion efficiency of the prior art catalyst alloy of 90% Pt–10% Rh under the operating conditions hereinbefore described in connection with apparatus of FIG. 1.

Figure 3:
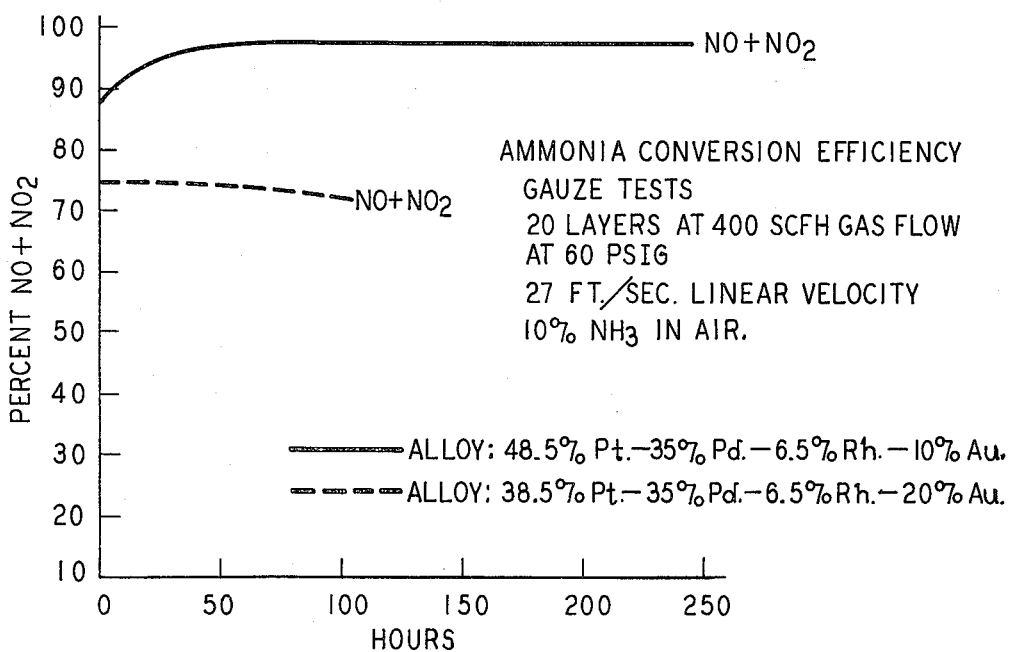
FIG. 3 illustrates a graphic representation of the ammonia conversion efficiency of a platinum-palladium-rhodium-gold catalyst alloy according to the invention compared with another platinum-palladium-rhodium-gold alloy.

FIG. 3 illustrates a graphic representation of the ammonia conversion efficiency of a catalyst alloy according to the invention composed of 48.5% platinum, 35% palladium, 6.5% rhodium and 10% gold as compared with the conversion efficiency of a catalyst alloy composed of 38.5% platinum, 35% palladium, 6.5% rhodium and 20% gold. It will be noted that this second catalyst alloy, while in the platinum-palladium-rhodium-gold system, gave much poorer results and is outside the scope of alloys of this invention of alloys within the range of 45.0 to 55.0% platinum, 30.0 to 50.0% palladium, 5.0 to 7.0% rhodium and 5.0 to 15.0% gold.

Various catalyst alloys for the oxidation of ammonia are herein contemplated within the scope of the appended claims.

What is claimed is:

1. A process for producing oxides of nitrogen from ammonia comprising contacting a mixture of ammonia and an oxidizing gas at a catalytically effective temperature with a catalyst consisting essentially of an alloy of about 45.0 to 55.0% platinum, 30.0 to 40.0% palladium, 5.0 to 7.0% rhodium and 5.0 to 15.0% gold.

2. A process as defined in claim 1 further comprising contacting said mixture at a temperature of about 650°C. to about 1000°C.

3. A process as defined in claim 1 wherein said coating gas is air and said mixture is about 90% air and 10% ammonia.

4. A process as defined in claim 1 wherein said catalyst is in the form of gauze.

5. A process as defined in claim 1 said alloy consisting essentially of about 48.5% platinum, 35% palladium, 6.5% rhodium, and 10% gold.

* * * * *